United States Patent
Peltz et al.

(10) Patent No.: US 6,862,502 B2
(45) Date of Patent: Mar. 1, 2005

(54) INTELLIGENT COMMUNICATIONS, COMMAND, AND CONTROL SYSTEM FOR A LAND-BASED VEHICLE

(75) Inventors: David M. Peltz, Melbourne, FL (US); Eugene A. Smith, Satellite Beach, FL (US); Mark Kraeling, Melbourne, FL (US); Robert James Foy, Melbourne, FL (US); Glen Paul Peltonen, Melbourne, FL (US); Steven Andrew Kellner, Melbourne, FL (US); Robert Francis Bryant, Palm Bay, FL (US); Don Keith Johnson, Palm Bay, FL (US); Dale Henry Delaruelle, Melbourne, FL (US)

(73) Assignee: General Electric Company

( * ) Notice: Subject to any disclaimer, the term of this patent is extended or adjusted under 35 U.S.C. 154(b) by 362 days.

(21) Appl. No.: 10/215,207

(22) Filed: Aug. 8, 2002

(65) Prior Publication Data

US 2003/0214417 A1 Nov. 20, 2003

Related U.S. Application Data

(60) Provisional application No. 60/381,110, filed on May 15, 2002.

(51) Int. Cl.$^7$ ............................ G06F 19/00; G06F 7/00; B60L 23/00
(52) U.S. Cl. ..................................... 701/19; 246/187 C
(58) Field of Search ........................... 701/19, 2, 1, 20; 246/187 C, 186; 707/104.1; 702/183, 113, 180; 700/65

(56) References Cited

U.S. PATENT DOCUMENTS

| | | |
|---|---|---|
| 4,582,280 A | 4/1986 | Nichols et al. |
| 5,034,878 A | 7/1991 | Haapala et al. |
| 5,039,038 A | 8/1991 | Nichols et al. |
| 5,164,941 A | 11/1992 | Delaney et al. |
| 5,435,505 A | 7/1995 | Martin |
| 5,535,336 A | 7/1996 | Smith et al. |
| 5,570,284 A | 10/1996 | Roselli et al. |
| 5,588,005 A | 12/1996 | Ali et al. |
| 5,608,412 A | 3/1997 | Welles, II et al. |
| 5,632,589 A | 5/1997 | Bray et al. |
| 5,666,365 A | 9/1997 | Kostreski |
| 5,681,015 A | 10/1997 | Kull |

(List continued on next page.)

FOREIGN PATENT DOCUMENTS

| | | |
|---|---|---|
| CA | 2248526 | 9/1998 |
| CA | 2266998 | 3/1999 |

*Primary Examiner*—Thomas G. Black
*Assistant Examiner*—Ronnie Mancho
(74) *Attorney, Agent, or Firm*—Carl Rowold, Esq.; Enrique J. Mora, Esq.; Beusse, Brownlee, Wolter, Mora & Maire, P.A.

(57) ABSTRACT

Method and communication system for a railroad train having at least one locomotive for automatically adjusting the communication system to provide effective communication of command data to control operation of the locomotive are provided. The system includes a transceiver on the locomotive. The system further includes at least one transceiver remote from the locomotive. A database may be provided for storing data relative to a plurality of communication schemes available to the communication system. A first monitor may be used for sensing a parameter indicative of the quality of the communications between the transceivers when the transceivers are operating under a first one of the available communication schemes and generating data indicative of communications quality. A processor in communication with the monitor and the database may be configured to select a second communication scheme when the quality of the communications provided by the first communication scheme is not satisfactory to ensure that the command data will be reliably communicated with respect to the locomotive.

61 Claims, 5 Drawing Sheets

U.S. PATENT DOCUMENTS

| | | |
|---|---|---|
| 5,682,139 A | 10/1997 | Pradeep et al. |
| 5,685,507 A | 11/1997 | Horst et al. |
| 5,686,888 A | 11/1997 | Welles, II et al. |
| 5,720,455 A * | 2/1998 | Kull et al. .............. 246/187 C |
| 5,740,029 A | 4/1998 | Ferri et al. |
| 5,777,547 A | 7/1998 | Waldrop |
| 5,862,171 A | 1/1999 | Mahany |
| 5,873,638 A | 2/1999 | Bezos |
| 5,950,967 A | 9/1999 | Montgomery |
| 6,041,216 A | 3/2000 | Rose et al. |
| 6,115,427 A | 9/2000 | Calderbank et al. |
| 6,175,784 B1 | 1/2001 | Jicha et al. |
| 6,198,920 B1 | 3/2001 | Doviak et al. |
| 6,216,095 B1 | 4/2001 | Glista |
| 6,225,919 B1 | 5/2001 | Lumbis et al. |
| 6,229,452 B1 | 5/2001 | Kull |
| 6,246,955 B1 | 6/2001 | Nishikawa et al. |
| 6,314,345 B1 | 11/2001 | Coombes |
| 6,317,466 B1 | 11/2001 | Foschini et al. |
| 6,322,025 B1 | 11/2001 | Colbert et al. |
| 6,337,978 B1 | 1/2002 | Inoue |
| 6,401,015 B1 | 6/2002 | Stewart et al. |
| 6,633,784 B1 * | 10/2003 | Lovelace et al. ............. 700/65 |
| 6,691,064 B2 * | 2/2004 | Vroman ...................... 702/183 |
| 2001/0020430 A1 | 9/2001 | Lenz |
| 2001/0037167 A1 | 11/2001 | Barberis et al. |
| 2002/0002583 A1 | 1/2002 | Fabri et al. |
| 2002/0006789 A1 | 1/2002 | Papini et al. |

\* cited by examiner

INTELLIGENT COMMUNICATIONS, COMMAND, AND CONTROL SYSTEM FOR A LAND-BASED VEHICLE

The present application claims the benefit of U.S. patent application Ser. No. 60/381,110, filed May 15, 2002.

FIELD OF THE INVENTION

The present invention relates to a railroad communication system.

BACKGROUND OF THE INVENTION

The present invention is generally related to communication, command, and control techniques, and, more particularly, to an intelligent communications, command, and control system for a land-based vehicle, such as a train with one or more locomotives, generally subject to variable environmental and/or operational conditions.

Environmental conditions and railroad operating conditions may independently or in combination impact the interaction of communications equipment and railroad control equipment. Complete and up-to-date information regarding environmental and operating conditions is desired for optimizing the management of a railroad system.

Communications on a moving vehicle, such as a moving train, truck, autobus, etc., are generally subject to a number of factors that can substantially impact the quality of communications. Thus, it would be desirable to measure the quality of communications. For example, such measurement may be used for determining whether the quality is satisfactory, and, if not satisfactory, for determining whether to adjust a communications scheme so as not to lose communication, or for determining whether any other communication scheme available in the vehicle may be more appropriate under a given set of communication-degrading conditions.

Communications (e.g., data or voice communications) in a moving train need to be reliable and accurate under a variety of changing operational and/or environmental conditions to achieve any desired locomotive control functionality, or to communicate with entities remote from the train, such as dispatchers, or a center for remotely providing monitoring and diagnostic services, or personnel in a rail yard or in loading/unloading station, or wayside equipment, etc. Thus, it would be desirable to provide a system configurable to provide a plurality of communication schemes, and further configurable to automatically choose a communication scheme appropriate to a given set of operational/environmental conditions.

It would be further desirable to provide a system configurable to provide a plurality of control modes, and further configurable for automatically choosing a control mode appropriate to a given set of operational/environmental conditions and/or a given communication scheme.

BRIEF SUMMARY OF THE INVENTION

Generally, the present invention fulfills the foregoing needs by providing in one aspect thereof a communication system for a railroad train including at least one locomotive for automatically adjusting the communication system to provide effective communication of command data to control the operation of the locomotive. The system includes a transceiver on the locomotive. The system further includes at least one transceiver remote from the locomotive. The transceiver constitutes part of a communication system. A database may be provided for storing data relative to a plurality of communication schemes available to the communication system. A first monitor may be used for sensing a parameter indicative of the quality of the communications between the transceivers when the transceivers are operating under a first one of the available communication schemes and generating data indicative of communications quality. A processor in communication with the monitor and the database may be configured to select a second communication scheme when the quality of the communications provided by the first communication scheme is not satisfactory to ensure that the command data will be reliably communicated with respect to the locomotive.

The present invention further fulfills the foregoing needs by providing in another aspect thereof, a communication system for a vehicle for selecting a preferred communication scheme for providing reliable data communication to the vehicle. The system includes a first transceiver on the vehicle. The system further includes a second transceiver remote from the first transceiver in communication with the first transceiver. A monitor may be used for sensing a parameter in the communication system that affects the quality of the communication between the transceivers. A first database of communication schemes may be available to the transceivers. A second database may be configured for relating the parameter sensed by the monitor to anticipated levels of communication quality for each communication scheme. A processor in communication with the monitor, first database and second database is configured for selecting a preferred communication scheme to provide a satisfactory level of communication quality for the parameter sensed by the monitor, and for communicating the preferred communication scheme to at least one of the transceivers.

In yet another aspect thereof, the present invention provides an intelligent communication, command and control system for a railroad train including at least one locomotive. The system includes a communication system configurable to provide a plurality of communication schemes for communicating command data usable for controlling operation of the train. The system further includes control equipment configurable to provide a plurality of control modes responsive to command data communicated by the communication system. A database may be configured to store data for associating the plurality of communication schemes with the plurality of control modes based on the data communication requirements of each respective control mode. A processor may be coupled to the database configured to match a communication scheme with a control mode for reliable control of the operation of the train in response to the command data communicated via the communication system.

BRIEF DESCRIPTION OF THE DRAWINGS

The features and advantages of the present invention will become apparent from the following detailed description of the invention when read with the accompanying drawings in which.

DETAILED DESCRIPTION OF THE INVENTION

Figure 1:
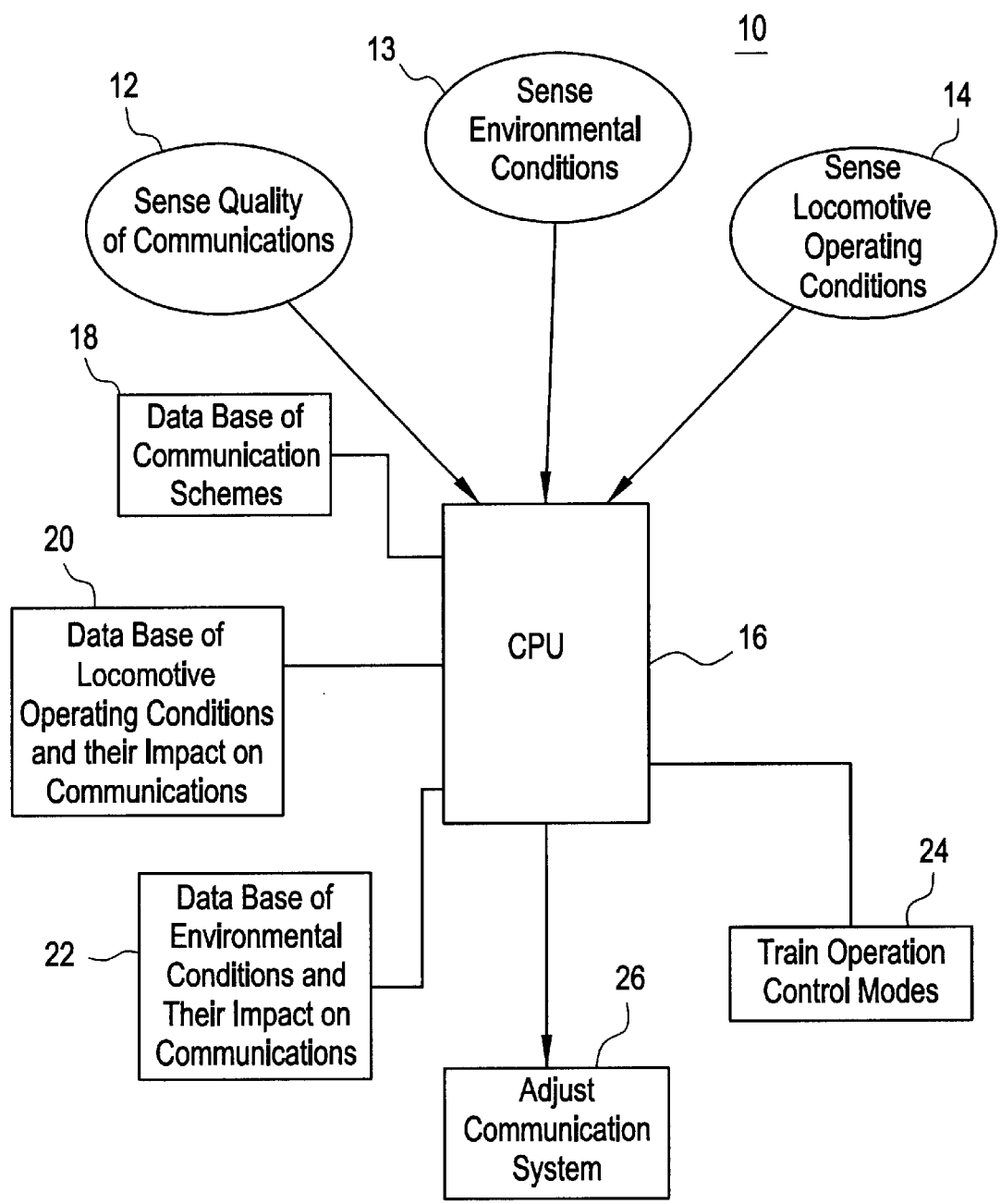
FIG. 1 is a block diagram representation of an exemplary intelligent communication command system embodying aspects of the present invention.

FIG. 1 is a block diagram representation of an exemplary intelligent communication command system 10 including a first monitor or module 12 for sensing communication quality by way of various communication statistics, such as number of bits lost in a message, number of parity bit errors, signal strength, dropouts, signal-to-noise ratio, fading, channel capacity, etc. System 10 further includes respective monitors or modules 13 and 14 for sensing environment and operating conditions such as terrain (hill, number of bends on the rail track, altitude), weather conditions such as fog, rain, solar storms, equipment configuration, failing equipment, multi-path effects, train equipment configuration, etc. In one exemplary embodiment, the respective outputs from modules 12, 13 and 14 are received by a processor 16 including algorithms for selecting an appropriate communication scheme and/or control mode for operating one or more locomotives in a train. A database 18 includes data indicative of a plurality of communication schemes available to a communication system 50 (FIG. 2), e.g., transceivers that provide communication of command data to the train, such as a transceiver on a lead locomotive and additional transceivers on the remainder of the train. It will be appreciated that the transceivers need not each be on the train since in some applications one or more of the transceivers may be external relative to the train. A database 20 includes data indicative of locomotive operating conditions and their impact on communications quality. A database 22 includes data indicative of environmental conditions and their impact on communications quality. A database 24 includes data indicative of a plurality of control modes for operating the train. Block 26 may represent actions for adjusting the communications system in response to signals supplied by sensing modules 12, 13 and 14 in view of the data stored in databases 18, 20, and 22 for selecting an appropriate communication scheme and/or control mode for operating the train. Further details in connection with each of the constituents blocks illustrated in FIG. 1 are set forth in respective sections below broadly titled to correspond to the operational relationships performed by such blocks.

Figure 2:
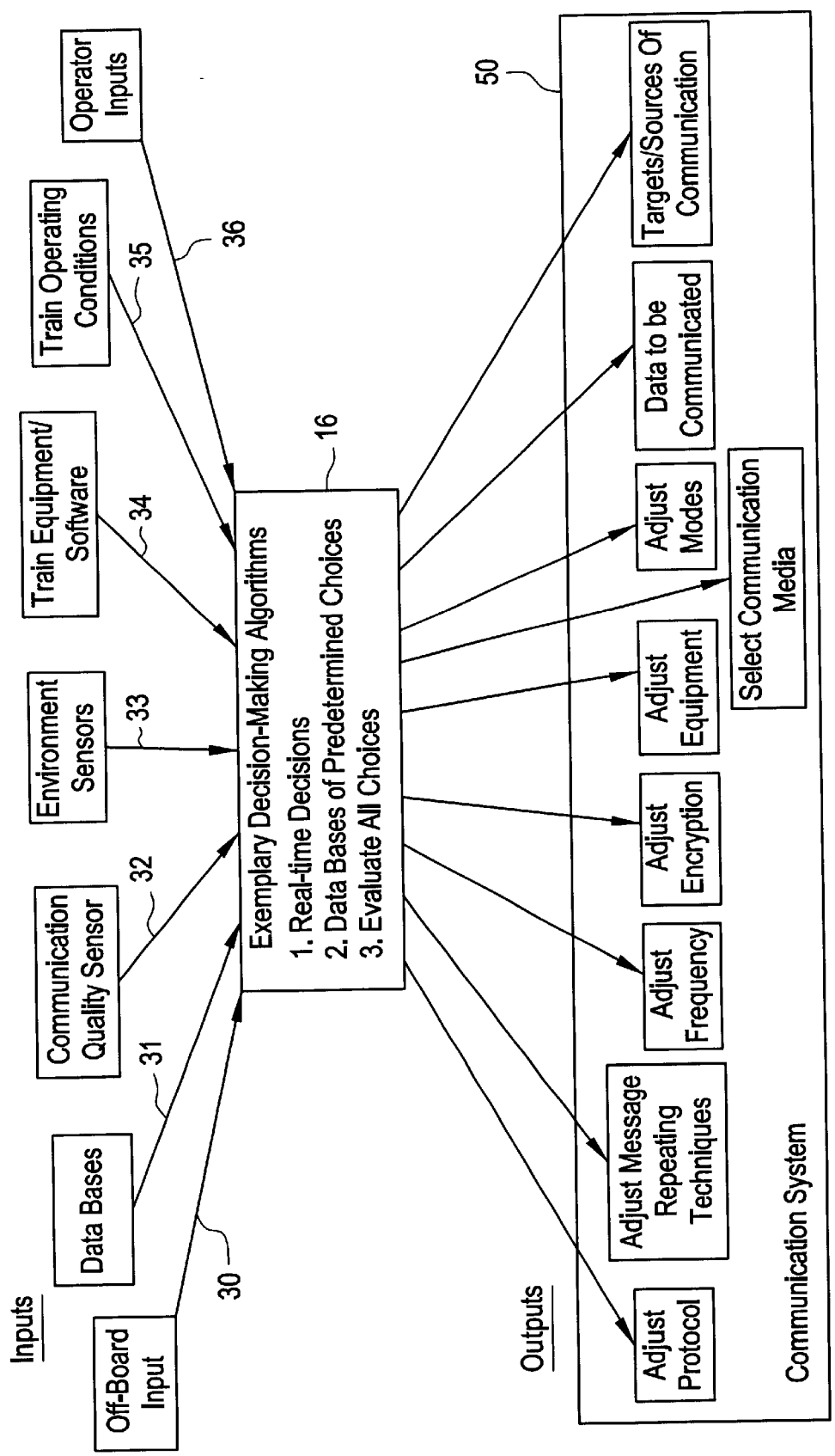
FIG. 2 is a block diagram representation of a processor used by the system of FIG. 1 for selecting an appropriate communication scheme.

FIG. 2 is a block diagram representation of processor 16 used by system 10 for selecting an appropriate communication scheme. As shown in FIG. 2, processor 16 is responsive to a plurality of input signals in order to select a preferred communication scheme to provide a satisfactory level of communication quality between the transceivers that make up communication system 50. Examples of the input signals received by processor 16 may include signals 30 configured to provide off-board communication, signals 31 configured to communicate with databases, e.g., on-board and/or external databases, signals 32 from a communication quality sensor, signals 33 from environmental sensors, signals 34 indicative of the specific configuration of train equipment and/or software, signals 35 and 36 indicative of train operating conditions and operator inputs. FIG. 2 further illustrates exemplary actions that may be selected by processor 16 in connection with the communication schemes available to the transceivers that make up communication system 50, such as communication media and/or protocol selection, frequency selection, selection of specific communication devices from multiple communication devices that may be distributed throughout the train, selection of message configuration, selection of the type of data to be communicated by the transceivers and of targets/sources of communication, selection of message-repeating techniques, selection of encryption, etc.

Figure 3:
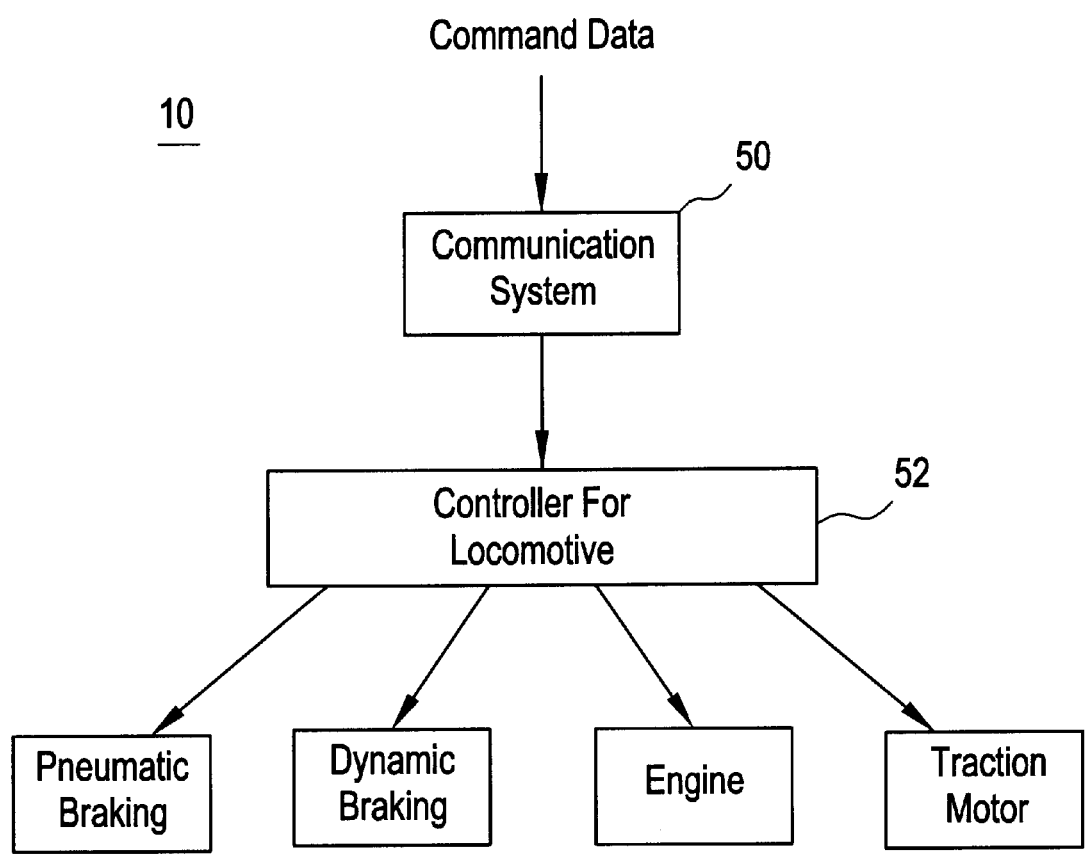
FIG. 3 is a block diagram representation of a controller used by the system of FIG. 1 for selecting an appropriate control mode.
Figure 4:
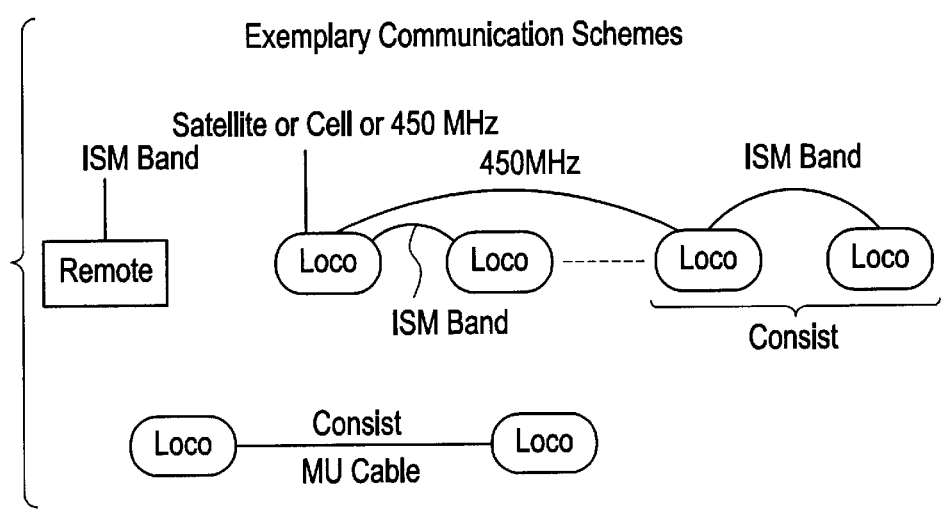
FIG. 4 illustrates various exemplary communication schemes that may be used by the system of FIG. 1.

FIG. 3 is a block diagram representation of a controller 52 that may be used by system 10 (FIG. 1) for selecting an appropriate control mode from a plurality of available control modes in response to command data communicated by the communications system 50 for controlling operation of the train. Some of the control modes selectable by controller 30 may include pneumatic braking control, dynamic braking control, engine settings, tractive effort commands to the traction motors. As illustrated in FIG. 4, the communication schemes may comprise many forms of communication, such as remote communication from an external control device, intra-consist communication, extra-consist communication, wireless or wired communication, off-board and on-board communication. As will be now appreciated by those skilled in the art, the communication schemes may be configurable over frequencies generally allocated by the FCC for railroad communication, (e.g., 500 Mhz). It will be understood that other frequencies, such as those in the ISM (Industrial Scientific Medical) band, or those used by satellite or cellular communication systems may be utilized to carry out communications of data for controlling train operation.

Sensing Environment and Operating Conditions
Overview

Environmental conditions and railroad operating conditions may independently or synergistically impact the interaction of communications equipment and railroad control equipment. Complete and current information regarding environmental and operating conditions is desired for optimizing the management of a railroad system.

Elaboration of Sensing Environment and Operating Conditions Aspects

Aspects of the present invention contemplate the use of one or more databases (e.g., databases 20 and 22 in FIG. 1) of information regarding both environmental and operating systems information. Such a database may take a variety of forms, such as a centralized computer memory or a dispersed grouping of memory elements interconnected via a network. Some of the information stored in such a database may be essentially static, such as information describing specific pieces of hardware in the railroad system. Some of the information in the database may be dynamic, such as weather information or the location of vehicles. Dynamic information may be provided in the form of a real-time link to a current source of such information. The railroad owner should maintain access security and data redundancy in accordance with data management procedures deemed appropriate.

The data stored in the database may be generally divided into two categories: environmental information and railroad equipment information. Environmental information may include information describing the general geography and topography of the entire railroad system. The routing and altitude along each section of track may be important for identifying curves and hills that could affect communications system performance. The presence and length of tunnels, bridges or other objects overhanging the rail line may be identified. Information regarding man-made structures proximate the rail line may be stored in the database. For example, the location and operating frequencies of radio communications towers may be important. The location and orientation of large metal structures such as buildings or tanks that may create radio multi-path interference may be stored in the database. Such information may be stored as location-specific data, such as an exact location of a large building. Alternatively, more generalized information may be stored, such as whether an area is generally rural or urban. Important weather parameters may be stored in the database or may be provided via a live link to such information. Important weather parameters may include atmospheric conditions such as the presence of fog, rain or lightning, and it may further include astronomical conditions such as the presence of sunspots or the position of the sun in the sky (i.e., night or day). For example, a laser source may be configured to project a laser beam in the atmosphere and a sensor may be used to determine how much laser light is scattered back and in this manner one could get an indication of how humid the air is, which may affect communication quality. In general, one could take advantage of any sensing technique that would help determine environmental conditions, using, for example, acoustic, optical, and radio frequency measurements. For example, a sound source may be configured to send out a sound wave and an acoustic sensor may be used to determine how much acoustic energy is returned. This could allow estimating the density of the atmosphere, or whether buildings are nearby, etc.

Areas that are served by geographically sensitive modes of communication may be identified in the database, such as areas of satellite or cell phone coverage, or the identification of such satellite or cell phone provider in a particular area. The database may also include information regarding the administrative or legislative environment of the railroad. For example, if there are political or geographic areas having more or less restrictive emissions requirements or noise limitations, these areas may be recorded in the database for use in the railroad management process.

Railroad equipment information may also be stored in the database of the present invention. Such information may include the identification of rolling stock, wayside equipment, repair facilities, refueling depots, fuel inventories, transmitter and repeater locations, etc. The physical location of such equipment may also be stored; in particular the location of rolling stock may be periodically updated. The configuration of trains may be stored, including the number, type and ordering of the cars and locomotives, as well as the cargo weight. For operating trains, the location, speed and direction may be stored and periodically updated. The model or version of equipment may be associated with performance parameters, such as the power level of a locomotive or the revision of a software program.

The information in the database of the present invention may be obtained and updated in a variety of ways. Static information may simply be manually or automatically entered into the database, for example entering the identification number and operating parameters of a new locomotive. Even static information may be updated as necessary, such as when a locomotive is upgraded to include new hardware or software that may affect its operating parameters. Geographic information may be stored and then displayed in the form of maps for use by a human operator, or may be accessed in any other form useable by data processing equipment.

Dynamic information may be sensed and periodically downloaded to the database. For example, the location of a train may be sensed via a global positioning system (GPS) or via wayside equipment and the database may be updated automatically on a periodic basis. The operability of communications equipment such as transmitters and repeaters may be periodically tested with an automatic testing regiment, and the status of such equipment then stored in the database. Weather data may be provided via local sensors (e.g., sensor module 13 in FIG. 1) associated specifically with the railroad system, or it may be downloaded in any available form from commercially available sources. Slow changing information may be updated less often than rapidly changing information. Vitally important information may be updated more often than information having a lesser importance.

Existing on-board sensors (e.g., sensor module 14 in FIG. 1) may provide a wealth of information regarding the operating status of a locomotive. Such information may include speed, direction, fuel consumption, available fuel volume, location, etc. Selected on-board information may be downloaded in real-time or on a periodic basis to the database.

Wayside equipment may be used to sense important environmental and operating conditions. Existing signals may be used or new sensors may be added to detect parameters important to the interaction of the communication and control equipment. For example, local electromagnetic conditions may be affected by electrical storms, fog, rain, the intermittent operation of nearby equipment, astronomical conditions, etc. A wayside sensor may be used to detect the quality of a communication channel in advance of the arrival of a train. That information may be stored in the database and may be used by the system to anticipate the quality of communications that will be available when the train arrives at the area of the wayside sensor.

Dynamic system-wide requirements may be developed that have an impact on the operation of the individual trains and locomotives. For example, a security threat may be identified through private or governmental channels. The existence of that threat may be loaded onto the database manually or by automatic links to the private or governmental channels.

The level of software revisions being used on various pieces of programmable equipment may be encoded into the software and may be interrogated to provide associated information for the database. Such information may be useful not only for determining what updates need to be made, but also may be useful when managing the communications and operating equipment for optimal railroad efficiency.

The system of the present invention may include an artificial intelligence capability for using or updating the environmental and operating condition information. When communication system failures prevent a scheduled update of dynamic information, an algorithm may be used to estimate the actual information on the basis of previous data trends. One or more neural networks may be utilized to allow the system to recognize patterns and trends in the environmental and operating condition information. Fuzzy logic may be applied to the information in the database to guide the railroad operator in making decisions based upon that data.

In summary, environmental and operating conditions may be sensed and related information may be stored and used in a variety of manners to optimize the operation of a railroad. Existing railroad sensor data, commercially available data, and information derived from such data may be stored, updated and used within the scope of the present invention.

Sensing Communication Quality
Overview

Wireless communications on a moving train are subject to a number of factors that can substantially impact the quality of communications. Aspects of the present invention contemplate measuring the quality of communications, determining whether the quality is satisfactory, deciding whether to adjust a communications scheme so as not to lose communication, and testing any new communication for quality.

Elaboration of Sensing Communication Quality Aspects

Aspects of the present invention contemplate that the wireless communications on the moving train may be performed through a variety of communication media, such as radio-frequency, optical, acoustical, magnetic, etc. Exemplary causes of loss of communications quality may be as follows:

A. Terrain (e.g., hill, bend, trees, tunnel)
B. Weather (e.g., rain, fog, lighting)
C. Nearby sources of interference
D. Changing antenna orientation
E. Failed Communication Equipment, e.g., repeaters, etc.
F. Multipath Effects
G Distance between transmitting and receiving equipment As will be appreciated by those skilled in the art, there are numerous ways for measuring communications quality. The listing below should be construed as an exemplary list of Communication Quality Indicators (CQI) (e.g., signals 32 (FIG. 2)) that together or in various combinations may be used for assessing the quality of a communications channel. The listing below is not meant to be an exhaustive listing.

A. Number of lost bits in a message
B. Number of bit parity errors
C. Signal strength
D. Drop-outs (e.g., momentary loss of signal)
E. Signal to noise ratio
F. Fading
G. Channel capacity A number of strategies or techniques may be selected for determining satisfactory communications quality. For example, one may compare any given communication quality indicator (CQI) against a condemning limit. In some situations, one may observe any given CQI over a suitable period of time and determine the presence of a trend in that CQI. One may then project as to when the CQI is likely to reach an unacceptable value. In one exemplary embodiment, a processor (e.g., processor 16 (FIG. 1)) may be configured to read a number of measurements of the CQI and compute a mathematical average before making an assessment of the quality of the communication system. In some other situations, the processor may be configured to impart an appropriate time delay between a first failed reading of the CQI and obtaining another reading before making an assessment of the quality of the communication system to see if the cause of the failed reading is temporary one. Thus, it is contemplated that various techniques will be used to avoid over-reacting to temporary glitches or noise that may not warrant declaring a loss of communication quality. Similarly, cross checks may be made to ensure reliability of one or more CQIs to ensure that conditions that do warrant declaring a loss of communication quality are not missed.

In one exemplary embodiment, the measurements for the various CQIs may be processed to generate a single indicator, e.g., an overall figure of merit (FOM) indication regarding the quality of the communication system. It is contemplated that databases may be populated with fleet-derived data wherein a correlation or prediction may be made as to the CQIs values as a function of one or more operational and/or environmental conditions. For example, it may be statistically predicted that the number of parity bit errors may increase as a function of train length, and as function of bends for a given communication equipment; or that the signal-to-noise ratio substantially degrades for a given communications protocol when proximate to multiple users, as compared to a different communications protocol. Once a determination is made that the FOM of a given communications equipment or scheme is unacceptable and that a change to a different communications equipment or scheme is needed, then various communication transition actions may be undertaken to avoid or reduce loss of communications. For example, the system may be configured to begin redundant communications or to anticipate a switch to a different communications link and notify a priori a target receiver of the expected change so that such receiver is ready to switch to the new communications link. Further, prior to changing to a new communications link one may test the quality of the new communications link before switching. It will be appreciated that since the CQIs of each communications link may not necessarily be the same, it is contemplated that the processor that receives the CQIs will be configurable to process and match the appropriate CQIs for the new communications link. In one exemplary embodiment, it is contemplated that evaluation of the original communications link may continue to be performed in the background so that in the event the operational and/or environmental condition that caused the change to a new communications link are removed, then communications may resume through the original link.

As suggested above, one could first attempt to communicate that a change in communication media and/or protocol is about to occur. However, in the presence of sudden changes in communication performance one may not have time to broadcast this information to the receiver. Under such scenario, communication may be momentarily dropped, and the communication system may go into a search algorithm based on the best information available to the search algorithm, and search through all the available communication schemes to see if the system could resume communications. At this point, the control functionality would make a decision to continue or discontinue train operation. For example, if one is able to continue train operation safely, the system would do so. Otherwise, the train would be brought to a stop. In one exemplary embodiment, the system would be configured to continue searching for the appropriate communication methodology that might be available. As suggested above, a database may be configured to relate specific communication schemes to specific environments, e.g., some schemes may be better than others for this particular environment. So the search would be configured to go through each methodology from the most likely to the least likely to work for a given set of environmental conditions, assuming the system was not able to send an indication of an impending change to a predetermined communication methodology.

In one exemplary embodiment, one may include within the normal communication, messages protocol and/or communication media information that the lead might have selected. For instance, there could be a straightforward code in the message that would indicate, in the event of a loss of communication, the communication media and/or protocol the system would go to next. In general, such code would indicate the next communication methodology the system would go to based on the sensed environment. The code may be dynamically adjusted and that code would indicate, if we were to lose communication, the next communication methodology the system would go to. In this manner, the remote receiver, would be able to narrow its searching. For example, if communication is suddenly lost, and the last information that the lead transmitted to the remote receiver indicated that the system should be configured to use a given communication methodology or scheme, based on the system intelligence for selecting that methodology. In this example, the remote receiver would try that given communication methodology first.

In general there does not have to be a drop in communication when transitioning from one communication methodology to another communication methodology. For example, if the system determines that the environment or the communication media is degrading slowly enough, the system may be configured to send the communications via both schemes to do an orderly handoff. For example, if the system senses a slow degradation over some time and further senses approaching into an industrial area with a lot of radio-frequency communication problems, then the system may be configured to, for example, start sending the same information via an optical path so that the appropriate receiver can pick the communication without experiencing any drop outs.

Sensing Quality of Train Control
Overview

Control of a moving train is subject to a number of factors that can substantially impact the quality of train performance. Aspects of the present invention allow measuring the quality of train control, determining whether the quality is satisfactory, deciding to adjust the control techniques so as to provide safe train operation.

Elaboration of Sensing Quality of Train Control Aspects

Exemplary causes of loss of control quality may be as follows:

A. Terrain (e.g., hill, bend, altitude)
B. Weather (e.g., rain, fog, temperature)
C. Loss or Poor Communication
D. Uneven distribution of loads
E. Failed Equipment.]
F. Equipment incompatibility
G Train Configuration As will be appreciated by those skilled in the art, there are numerous ways for measuring control quality. The listing below should be construed as an exemplary list of Vehicle Control Quality Indicators (VCQI) that together or in various combinations may be used for assessing the quality of a control strategy. The listing below is not meant to be an exhaustive listing.

A. Tractive effort commensurate with operational and/or environmental conditions
B. Notch settings commensurate with operational and/or environmental conditions
C. Fuel consumption commensurate with control strategy
D. Vehicle speed and/or direction commensurate with operational and/or environmental conditions
E. Braking effort (friction and/or dynamic) commensurate with operational and/or environmental conditions
F. Wheel-slip conditions
G. Coordination of each of the above in a train with multiple locomotives or with a remote control center As discussed above in the context of evaluating communication quality, a number of strategies or techniques may be used for determining satisfactory control quality Selecting Adjustments to Improve Communications
Overview Communications (e.g., data or voice communications) in a moving train need to be reliable and accurate under a variety of changing operational and/or environmental conditions to achieve any desired locomotive control functionality, or to communicate with entities remote from the train, such as dispatchers, or a center for remotely providing monitoring and diagnostic services, or personnel in a rail yard or in loading/unloading station, or wayside equipment, etc.

Elaboration of Aspects for Selecting Adjustments to Improve Communications Aspects In aspects thereof, the present invention allows adjusting communication parameters in communications system 50 (FIG. 2) to ensure reliable and accurate performance under such changing operational/environmental conditions. Below is a list of exemplary communication parameters that may be adjusted in view of any of multiple operational and/or environmental conditions under which a given train may have to operate. In another aspect thereof, under certain conditions, it is contemplated that adjustments may be made to the locomotive control strategy so that a locomotive controller may select a respective control mode that may be supportable by the communication system, as that system may from time-to-time sub-optimally operate under demanding operational/environmental conditions.

a) Change Communication Media

Aspects of the present invention contemplate that the train communication system may include communication devices that allow communicating through various communication media, such as radio-frequency, optical, acoustical, magnetic, etc. For example, an exemplary embodiment of the train communication system could include devices configured to provide optical communication, e.g., infrared or laser light, and devices configured to provide RF communication. One possible choice for such an embodiment would be for the system to choose between optical and radio-frequency communication. For example, in clear weather, the optical path would generally be better than the radio path. However, if, for example, it is snowing or raining, the radio path could have better performance than the optical path.

b) Change Communication Protocol

It is contemplated that multiple communication protocols may be available and selected to ensure accurate and reliable data communications under challenging environmental and/or operational conditions. In one exemplary embodiment, the communications protocol may be changed from one protocol to another protocol to allow, for example, greater channel utilization in crowded areas, or greater immunity to noise, or adequate signal levels under low-power conditions, etc. As will be appreciated by those skilled in the art, appropriate tradeoffs may be made to balance greater channel utilization versus overhead control. One example of a communications protocol that may be advantageous in crowded areas may be a time division multiple access (TDMA) protocol, such as could be used in railyards and in other locations where there are likely to be many users present simultaneously and in relatively close proximity. As will be appreciated by those skilled in the art, TDMA represents one of several communication techniques used to separate multiple information transmissions over a finite frequency allocation of through-the-air bandwidth. As with FDMA (Frequency Division Multiple Access), TDMA may be used to allocate a discrete amount of frequency bandwidth to each user, in order to permit many simultaneous transmissions. Each transmitting radio would be assigned a specific timeslot for transmission. In one exemplary embodiment, the yard could be provided with a suitable timing beacon signal that when sensed by a receiver onboard a respective locomotive in the yard, would cause the communication system onboard that locomotive to switch to the TDMA control and control the slot timings of that system. It is expected that the efficiency gain in frequency spectrum utilization should be quite significant. Under some conditions, a CDMA (Code Division Multiple Access) protocol, also referred to as spread spectrum, may also provide increased channel capacity and efficient use of the spectrum. Further, CDMA would allow the following features with additional improvements to communications performance: 1) A "soft hands-off" feature that ensures that a transmission is connected before handoff is completed, thus reducing the probability of a "dropped" transmission. 2) Variable rate vocoding would allow message bits to be transmitted at just the rates needed for achieving a desired control function, thus conserving valuable bandwidth. 3) Configurable with multipath signal processing techniques that allow to tradeoff power level for increased signal integrity. For readers who desire background information regarding telecommunications and networking techniques, reference is made to "Newton's Telecom Dictionary" by H. Newton, published by CMP books.

Thus, as suggested above, one aspect of the present invention contemplates changing the communications media and/or protocol to meet specific operational/environmental conditions. For example, there may be at least one communication protocol suitable for low-traffic locations with low probability of interference. There may be at least one communication protocol suitable for high-traffic locations with high probability of communication collisions. There may be at least one communication protocol suitable for communication applications when a high bandwidth of information is needed. For example, there may be train control functions that demand relatively high bandwidth. The communication system would be responsive to the respective locomotive controller that would provide a respective signal indicative of the control state to the communication system. Thus, based on the bandwidth needs of the respective control state being presently executed, an appropriate protocol would be selected to meet such bandwidth needs. Similarly, there may be at least one communication protocol suitable for communication applications when a low bandwidth of information is sufficient to achieve any desired train control function.

As will be appreciated by those skilled in the art, some communication media and/or protocols might work better under a given set of environmental conditions. Thus, one aspect of the present invention contemplates configuring a database that relates each available communication scheme (e.g., stored in database 18 (FIG. 1)) to a respective set of environmental conditions that would be appropriate to maintain a high level of communication quality in the presence of such environmental conditions. For example, such a database might allow determining whether a given protocol or communication media is appropriate if it is raining out versus a sunny day or if the train is operating in a congested area versus an area free from interfering sources.

As will be appreciated by those skilled in the art, various communication characteristics can be expected to improve as a function of the respective protocol being selected. Examples of such communication characteristics may include bandwidth utilization, interference avoidance, jamming avoidance, data transfer reliability, signal-to-noise ratio, etc. As will be further appreciated by those skilled in the art, the respective sections of the protocol instructions may reside in a suitable read/write memory that may be upgraded, locally or remotely, in order to more efficiently enhance capabilities, correct bugs, scale protocol capacity, etc.

c) Security Measures

In light of increased unrest in the world, respective sections of the protocol code may be programmable to allow any desired encryption and/or authentication technique to be inserted or switched on. Further, in accordance with aspects of the invention, the selection of the specific encryption and/or authentication technique may be selected to achieve a desired communications quality in view of the operational and/or environmental conditions to which the train may be subject to. For example, a particular encryption technique may be more suitable for relatively benign environments from a communications point of view. However, there may be other encryption techniques that may tradeoff encryption sturdiness versus more reliable communication in a harsher environment from a communications point of view. As will be appreciated by those skilled in the art, there are a number of techniques for performing encryption and/or authentication. By way of example, the cryptographic techniques could be symmetric (one-key), as taught in U.S. Pat. No. 5,239,584 (granted Aug. 24, 1993) entitled "Cryptographic Module for Instrument Encryption", which patent is commonly assigned to the assignee of the present invention. The encryption techniques could also be based on public key ("two key") asymmetric cryptographic techniques. The security measures could include encryption of messages (protection of content) and/or authentication (verification of valid origination). In the latter, the messages would protect against spoofing, such as preventing insertion of bogus commands or undetected alteration of valid messages.

d) Adjust Message-Repeating or Message-Reply Techniques

It is contemplated that one may adjust message-repeating techniques in the communication system to verify reliable communication under severe environmental and/or operational conditions. For example, a database may be configured to store a plurality of message-repeating and/or message reply algorithms that may be automatically selectable to provide reliable communication in the presence of such severe conditions. The system would be configurable to consider tradeoffs, such as data latency versus communication reliability, in order to select an appropriate message-repeating technique under a given set of environmental conditions.

e) Change Frequencies Within Band

Another aspect of the present invention contemplates changing frequencies in a communication channel to improve communication under adverse conditions. More particularly, it is contemplated to provide a communication system with frequency agility capability. That is, a communication system with the ability to shift automatically between a plurality of frequencies in a respective frequency band. For example, the communication system may be configured to sense whether a communication channel, (e.g., in a first frequency) is experiencing degradation, as may be determined by a figure of merit (FOM) indicative of quality of communication. For example, in a FOM scale that ranges from 1–10, a FOM of 1 may indicate optimal quality, a FOM of 10 may indicate unacceptable quality, while a FOM of 5 may indicate moderate quality. The system may be programmed so that when the FOM indication reaches a predefined value, then the system will switch to a second frequency. If improvement in the communication quality is sensed at the second frequency, then the communication system will operate at the second frequency. If no improvement in communication is sensed at the second frequency, the system will be switched to another frequency until an appropriate frequency is found for performing any desired communication. If no frequency is found where the FOM indication reaches an adequate value, the communications will be attempted after waiting some appropriate time interval. Alternatively, one could attempt the communication using a communications protocol more suitable for the present environmental/operational conditions, as discussed above.

For example, let us assume that the high frequency radio signals or the radio environment is getting degraded. Further assume, that there is a low frequency channel that is available. However, the low frequency channel would provide a slower data rate. Thus, in this example control criticality would be a factor to consider. If, for example, the low frequency channel provides 75 bits per second as opposed to 4,000 bits per second, then the system would be configured to account for the reduced bandwidth capability. For example, the system may be configured to just send the critical information that is truly needed to support safe train operations and cut out other messages that are not as important.

f) Change Communication Devices—Multiple Antennas and Radios

It is contemplated that multiple communication devices may be appropriately selected or changed to ensure accurate and reliable data communications under certain environmental and/or operational conditions. Multipath interference, obscuration effects, and device malfunctions are examples of detrimental effects that may be addressed using multiple communication devices. As suggested above, a control/communication system embodying aspects of the present invention may be used to remotely control and monitor locomotives distributed throughout a train. In one exemplary embodiment, wireless communications is used to provide the control and monitoring functions. In some applications, factors such as train length, objects in the vicinity of the train, weather conditions, etc., could affect the quality of the radio communications. Aspects of the present invention allow improving radio communication integrity regardless of train length under adverse environmental and/or operational conditions.

As trains become longer and longer, wireless communications between locomotives at the head end of a train and locomotives and/or equipment located back in the train could become more difficult due to RF multipath interference effects that may be experienced by any given radio receiver. These interference effects could result in a loss of communications among various sections of a train, such as between the front and rear locomotives and/or equipment, for example, and this may result in undesirable operating conditions. It should be understood that while various embodiments of the present invention may be used with wireless communications systems for train applications, variations of the present invention may also be adapted for other industrial, commercial or private applications confronted with similar communications problems.

One exemplary embodiment uses an enhanced and improved digital communication scheme to minimize the effects of RF multipath interference. By way of example, each locomotive and/or equipment of a train may be equipped with multiple sets of communication devices, such as appropriate RF transmitters, antennas and receivers, for example. As will be appreciated by those skilled in the art, the number and location of such communication devices to be used for implementation in a practical embodiment of the present invention may be ascertained through empirical, experimental and/or analytical techniques. Multiple antennas may be mounted on the locomotive and/or equipment that are separated in distance from each other. Each antenna may feed into its own separate radio receiver. The signals from each receiver may then be processed independently by appropriately configured digital processing equipment. As RF multipath interference generally causes poor or loss communications at one of the antennas, another antenna that, may be located an appropriate distance away, may presently experience minimal multipath effects and reception of valid communication signals may occur. While the first radio receiver may experience invalid communication data being received, another radio receiver may receive valid communication data. The digital processing equipment may analyze each communication signal from each receiver so that invalid communication data may be discarded while the valid communication data may be accepted and valid communications with the sending unit may be maintained.

g) Change to a Mode of Control Supportable by Available Communication

Another aspect of the present invention contemplates changing a present control mode of locomotive operation to a different control mode that may be more readily supportable by the communication system in view of present environmental and/or operational conditions being experienced by the communication system. For example, in the event of degradation of communication capability, the locomotive controller may be switched to provide partial functionality for various control features, such as Distributed Power (DP) control, train control from a hand-held unit as may be used by an operator outside the train in a train yard, Multiple Unit (MU) operation or, in the alternative, tradeoffs may be made as to the availability (or lack thereof) of such functionality under various operational conditions. For example, if certain control mode requires a bandwidth, which is momentarily not supportable by the communication system, then the locomotive controller would select a different control mode that may be presently supportable by the communication system. Thus, aspects of the present invention particularly contemplate an integrated communications/control system that provides "graceful degradation" for transitioning from one mode to another mode without compromising safe train control during periods when the communication system may only provide some limited communication functionality in view of severe environmental and/or operational conditions.

h) Change Data Communicated

As suggested above, there may be situations, e.g., switching to a low frequency channel, where due to operational/environmental conditions certain types of data may not be fully provided or not provided at all by the communication system. It is contemplated, however, that changes in the type of data communication may be made to achieve some degree of information transfer. For example, as suggested above, one may be able to adjust data transfer rates to provide some functionality. For example, assuming that a communication channel may momentarily support a low bandwidth, it is contemplated that one may use bandwidth compression techniques to reduce the amount of bandwidth needed to transmit a given amount of information. It will be appreciated that if one performs data "compression" at one end of a communications channel, then one would use a compatible data "decompression" technique at the other end of the communication channel. It is further contemplated that in certain conditions one may perform data conversion from one format to another format that may be compatible with the communication medium that may be available for carrying communications. For example, when the communication system is affected by environmental and/or operational conditions, there may be some limited communication functionality, which could be performed provided the data to be transmitted is in a particular format. If such a data is generally provided in a different format, then data conversion to the particular format would enable transmission of the data even with the limited communication functionality. Thus, this aspect of the invention allows changing the messaging characteristics to satisfy the criticality of the control mode being supported by any given communication methodology.

i) Targets/Sources of Communication

It is further contemplated that a communication system embodying aspects of the present invention would include a strategy for changing targets and/or sources of communication under specific operational/operational conditions. For example, there may be targets that may not need rapid or continuous data transfers without compromising reliable train operation. Thus, during periods when due to certain operational/environmental condition the communication system may not be able to support fast data transfers, the system would automatically select targets and/or sources suitable to any presently available communication capability. Thus, in this example, the targets of communication that would be selected would be those that do not need rapid or continuous data transfers. For example, distributed power in a train can be run in two modes of operation. One being a master/slave mode where the remote locomotive follows the commands of the lead and an independent mode where control of the remote locomotive is independent from the control provided to the lead locomotive. In the event of degraded communication performance, the system would be configurable to allocate most available communication resources to the independently controlled locomotive and lesser resources to the locomotive that mimics the lead. This follows because it would be desirable to have as much information from/to the remote locomotive, which is operating independently from the lead. Conversely, in the case of the locomotive that mimics the lead, the level of control criticality would be lower relative to the locomotive in the independent mode of operation and therefore the level of communication resources that needs to be allocated to the mimicking locomotive may be relatively low. Thus, targets and/or sources of communication may be chosen depending on which equipment of the train or which locomotive of the train may need more critical communication services. As used herein the expression "target" and/or "source" should not be construed as just one specific receiver, since that expression broadly encompasses any communication of data for performing a particular function related to the operation and/or control of the train that would allow the locomotive or an external user to receive information to accomplish whatever operation they need to accomplish.

Algorithm/s for Choosing Proper Communication Scheme and/or Proper Control Mode

Overview

Data communication on a moving train may be affected due to a variety of changing operational and/or environmental conditions. Assuming a plurality of communication schemes are available in a communication system, the present invention contemplates one or more algorithms, such as may be executed in processor 16 (FIGS. 1 and 2), for automatically choosing the communication scheme appropriate to a given set of operational/environmental conditions.

Elaboration of Aspects For Choosing Proper Communication Scheme

The listing below provides an exemplary list of exemplary input signals to such algorithm/s.

A) Quality of Communication Measurement

B) Equipment Availability

C) Train/Locomotive Functionality required/desired at any given time/location

D) Signals indicative of operational/environmental conditions

E) Operator Commands

F) Desired Control Mode

As will be appreciated by those skilled in that art, it is contemplated that such algorithm may use various processing techniques to select an appropriate communication technique under a given set of operational and/or environmental conditions. For example, in one exemplary processing technique, the algorithm may be configured to compare the input signal/s versus pre-programmed reference communication states. For example, if the indication of communication quality indicates poor communication performance, and the signals indicative of operational and/or environmental conditions indicate a high traffic area, then the reference state that matches such operational and/or environmental conditions may reconfigure the communications system to a communication technique suitable for such conditions. It will be appreciated that the frequency at which the algorithm makes a determination of whether to reconfigure the communication system may be partly based on the environment in which the train is operating. For example, if the train is traveling in open fields, relatively free of physical obstructions, under low traffic conditions and benign atmospheric conditions, the need of performing frequent determinations would be less as compared to train travel in congested fields, with many physical obstructions. Thus, it is contemplated that the processing may be done continuously on the fly (real time) under certain operational situations. As suggested above, there may be situations that would not warrant such processing. For example, train operation in a low-traffic area, or in a benign environment versus operation in a high traffic area or harsh environment.

It is contemplated that such processing may be performed under various modes, such as fully automatic, semi-automatic or manual so as to provide flexibility to what extent, if any, the operator may be involved in the process of changing from one communication technique to another communication technique. It is further contemplated that the algorithm would include logic for performing cross-checks and/or self-consistency checks to ensure reliable and accurate operation of the algorithm itself. Exemplary outputs of the algorithm would include providing to the operator respective indications as to a present communication scheme or state and a new communications scheme or state, which the algorithm has determined to be more appropriate under a given set of operational/environmental conditions. Moreover, the algorithm may be configured to provide an actual or estimated Figure of Merit (FOM) indication for each available communication scheme.

The algorithm/s may be configurable so that options may be available so that the user could choose options regarding the processing strategy for selecting any given communication scheme, such as conserving MIPS or processing power versus obtaining an optimal solution. In some situations, the algorithm may be configurable to provide an optimal solution evaluating all variations and alternatives (possibly using lots of computational time and power) versus sub-optimal solutions that may be reached much quicker. In some applications, the algorithm may be configured as a self-adjustable algorithm. For example, the algorithm may be configured to determine based on actual operational/environmental conditions whether an optimal solution is actually needed or whether sub-optimal solutions may provide an acceptable solution to the problem of selecting an appropriate communication scheme in view of the operational and/or environmental conditions to which the communication system may be subject to. The algorithm may be further configured to be a self-learning algorithm, based on historical databases reflecting fleet information, as may be stored in a remote diagnostic service center (RM&D), or based on the respective historical data of a given train, as may be stored on-board that train. It is further contemplated that the decision-making algorithm may be configured to suggest upgrades to the communication schemes. For example, assuming communication schemes A B and C are presently available, the system may be configured to suggest a new D scheme that should be considered in view of shortcomings in the A, B, or C schemes.

Figure 5:
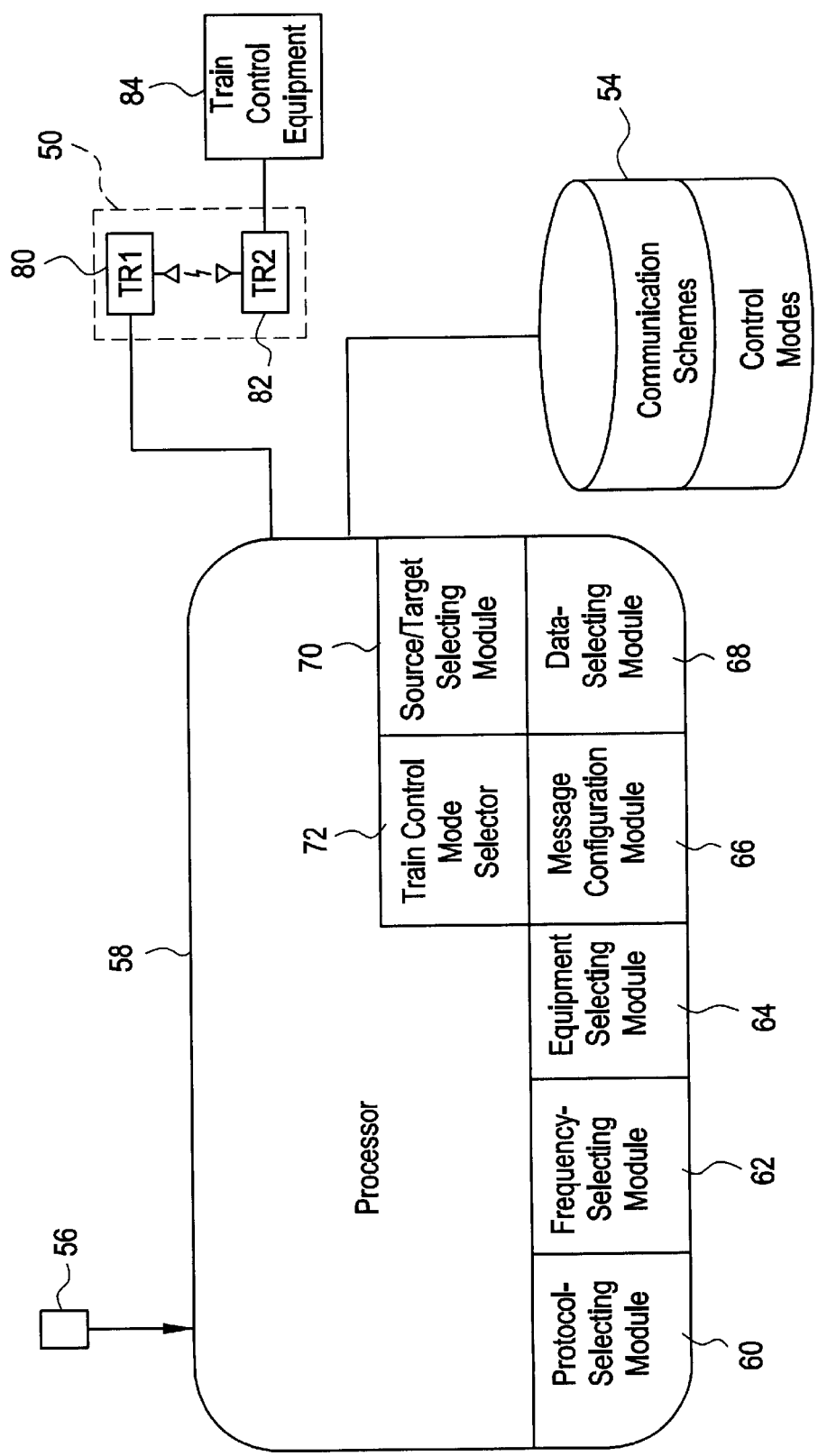
FIG. 5 illustrates an exemplary embodiment of a communication command and control system embodying aspects of the present invention as may be configured for a railroad train having one or more locomotives for automatically adjusting the communication system to provide effective communication of command data to control operation of each locomotive.

FIG. 5 illustrates an exemplary embodiment of a communication command and control system for a railroad train having one or more locomotives for automatically adjusting the communication system to provide effective communication of command data to the train to control the operation of the train. As shown in FIG. 5, the system may include one transceiver 82 on the locomotive and at least one transceiver 80 remote from transceiver 82. As will be appreciated by those skilled in the art, each transceiver constitutes part of communication system 50. It will be appreciated, however, that the present invention is not limited to two transceivers since the number of transceivers may be any number that meets the communication requirements for any given train application.

As suggested above, a database 54 may be used for storing data relative to a plurality of communication schemes available to the transceivers. A first monitor 56 may be used for sensing a parameter indicative of the quality of the communications between the transceivers when the transceivers are operating under a first one of the available communication schemes and generating data indicative of communications quality. A processor 58 in communication with the monitor and the database may be configured to select a second communication scheme when the quality of the communications provided by the first communication scheme is not satisfactory to ensure that the command data will be reliably communicated to the train. In the event the second communications scheme is unable to provide satisfactory communication quality, the processor is further configured to select another communications scheme likely to provide satisfactory communications quality.

The database may include data indicative of a plurality of distinct communication protocols available to the transceivers. As shown in FIG. 5, the processor may include a module 60 for selecting a first communication protocol from the plurality of distinct communication protocols based on the likelihood of the first protocol to provide satisfactory communication quality between the transceivers. The protocol-selecting module is further configured to select a second communication protocol when the quality of the communications provided by the first communication protocol is not satisfactory.

By way of example, the database may further include data indicative of a plurality of distinct frequencies available to the transceivers. In this case, the processor would include a module 62 for selecting a first one of the available frequencies based on the likelihood of the first frequency to provide satisfactory communication quality between the transceivers. The frequency-selecting module 62 is further configured to select a second one of the available frequencies when the quality of the communications provided by the first frequency is not satisfactory.

The database may include data indicative of configurations of equipment on the train, with at least one configuration including multiple communication devices distributed throughout the train. In this case, the processor would include a module 64 for selecting a first communication device from the multiple communication devices distributed throughout the train. The selection may be based on determining which respective communication device is likely to provide satisfactory communication quality. The equipment-selecting module would be configured to select a second one of the multiple communication equipments when the quality of the communications provided by the first communication equipment is not satisfactory.

The database may include data indicative of a plurality of distinct messaging configurations. In this case, the processor would include a module 66 for selecting a first one of the plurality of distinct message configurations based on the likelihood of the first message configuration to ensure reception of the command data throughout the train. Examples of possible message configurations may include adjusting the message data rate that may be supported by a communication channel, or selecting a message-replying and/or message-repeating technique, or selecting a message encryption technique suitable to a given environment. As suggested above, each message may include code configured to communicate to each transceiver a communication scheme to switch to in the event of sudden communication loss so as to avoid protracted searching of an appropriate communication scheme.

The database may include data indicative of a plurality of distinct types of data communicable by the transceivers. In this case, the processor may include a module 68 for selecting a first type of data to be communicated by the transceivers. The first type of data may be selected from the plurality of distinct types of data based on the likelihood of the first type of data in being satisfactorily communicated between the transceivers. The database may further include data indicative of a plurality of distinct types of data sources and/or targets available to the transceivers. In this case, the processor would include a module 70 for selecting a first one of the distinct types of data sources and/or targets based on the likelihood of the first type of data source and/or target to obtain satisfactory communication quality between the transceivers.

In other aspects of the invention, control equipment 84 is configurable to provide a plurality of control modes for controlling operation of each locomotive based on command data communicated by the communication system 50, e.g., made up of transceivers 80 and 82. The database may be configured to store data for relating respective ones of the plurality of communication schemes to respective ones of the plurality of control modes based on the data communication requirements of each respective control mode. In this case, processor 58, when coupled to such database, may be configured to select a communication scheme anticipated to meet the data communication requirements of a presently selected control mode. In the event the presently selected communication scheme cannot reliably communicate the command data for the presently selected control mode, the processor may be further configured to select a second control mode whose data communication requirements are likely to be met by a presently available communication scheme.

Elaboration of Aspects for Choosing Proper Control Mode

Overview

Control of a moving train may be affected due to a variety of changing operational and/or environmental conditions. Assuming a plurality of control schemes are available in a train control system, the present invention contemplates one or more algorithms for automatically choosing the control scheme appropriate to a given set of operational/environmental conditions. That is, a control scheme appropriate to the communication quality that may be achievable under any such conditions. Examples may include selecting a control scheme appropriate to train speed or dynamics. For example, it should be appreciated the need of relatively higher quality of communication for controlling a train moving at a high speed relative to a slower-moving train, or the need of higher communication quality for achieving accurate train stoppage for a heavily loaded train versus a train with a relatively light load. Another example, in the context of a train with multiple locomotives, may be the need of higher communication quality for a train providing independent control to each locomotive relative to a train where each trailing locomotive just mimics the lead locomotive.

The listing below provides an exemplary list of exemplary input signals to such algorithms.

A) Quality of Control Measurement

B) Equipment Availability

C) Train/Locomotive Functionality required/desired at any given time/location

D) Signals indicative of operational/environmental conditions

E) Operator Commands

F) Status of Communication Quality

The same considerations discussed above in the context of the algorithm/s for choosing the appropriate communication scheme are similarly applicable to the algorithm/s for choosing the appropriate control scheme and thus the reader will not be burdened with repetitive information. It will be appreciated that both algorithms are configured to have a relatively high degree of interconnectivity since, for example, the status of the communication scheme available may affect whether a particular control mode is achievable under certain operational and/or environmental conditions. Similarly, commanding a particular control mode may influence which communication scheme is selected since some control modes may, for example, require a high bandwidth or may require rapid transfer rates that may be achievable by some (but not all) of the communications schemes that may be available in the communication system.

To provide reliable and safe operation under various operational conditions, knowledge of control conditions would be configured in the logic of the intelligent communication, control and command system embodying aspects of the present invention. One exemplary scenario may be as follows. Assuming there is a sudden loss of communication and the train is cruising along flat lands and there is nothing really critical around the train, no curves coming up, no crossing streets. Then, in this scenario, because in general the environment is conducive to safe train operation, the system would perform a search to find an appropriate communication scheme, and the train may be allowed to just coast, notwithstanding of the communication loss, at least for a given period of time where train operation is deemed to be safe. However, if based on the knowledge of present train control conditions, one senses an environment with lots of turns or an approaching hill, etc. Then, under this other scenario, the system should be commanded into a train-halting state sooner in the presence of lost communications. As suggested above, the intelligence on-board the train would allow determining, for example, whether coasting through the communication loss is appropriate or whether immediate action is necessary because of the criticality of the control environment. Thus, it will be appreciated that one key advantage of the present inventions is the high level of interconnectivity and interplay between the communication-selection logic and the control-selection logic, such as evaluating the type of communication media to use or the type of modulation to perform, or the actual messaging structure in order to provide control functionality that the system is able to support under any particular set of environmental and/or operational conditions.

Aspects of the present invention contemplate providing intelligence on board for determining or detecting whether any specific communication and/control capabilities are actually available or not. This may be implemented by way of an automatic query, somewhat analogous to Plug and Play tools used when installing new hardware into a computer. This functionality would allow the system to recognize what specific capabilities are available in any given train configuration.

The inventors of the present invention have advantageously recognized that a communication, control and command system that dynamically and integratedly weighs in or processes the various control and communication capabilities of the train under any given set of environmental and/or operational conditions would provide enhanced and reliable train operation. For example, the intelligence of the system would allow taking advantage of an available high data rate when the system senses availability of that high data rate, and, accordingly, the messaging structure will be configured to be compatible with such high data rate capability. However, in the presence of degraded communication, the system would switch to a mode that will still provide critical information through to support a desired control mode, with the understanding that now the system may only send the critical information. Thus, it will be appreciated that the system decision-making logic is inter-related to each communication methodology and each control mode the train is trying to implement, both subject to any applicable environmental and/or operational conditions. For example, based on the sensed environment, it may be possible to use a low data rate channel, e.g., using a 75 bit per second channel, if the train is, for example, cruising through the plains of Nebraska with nothing going around. However, if, for example, the train is on the hills of West Virginia, then the decision may be to stop the train, until an appropriate communication channel becomes available. Thus, it will be appreciated that both the communication-selection logic and the control-selection logic for running the train are closely inter-related to one another. In operation, one key concern is running the train safely and one may now even more reliably and accurately achieve that objective by using an intelligent communication, control and command system that flexibly accommodates various tradeoffs, such as changing the amount of data sent, based on criticality of train control and determining the most appropriate communication methodology for the environmental conditions.

Use of Data for Enhancing Performance of a Given Train, Including Improving Performance of the Train as Part of a Transportation System Overview Operation of one locomotive—let alone multiple locomotives—in a train requires reliable and accurate control to achieve enhanced and safe train performance, including improved performance of the train as part of a transportation system, under a variety of operational and/or environmental conditions. Aspects of the present invention provide communications and control system configured to provide independent yet closely coordinated control, addressability, or both, to key operating systems, such as braking equipment, either friction or electrical brakes, propulsion equipment, coupling/decoupling equipment, speed control equipment, etc. It would be further desirable to share such information on real time basis with entities remote from the train, such as entities that manage the transportation system.

Elaboration of Aspects for Using Data for Enhancing Performance of a Given Train Below is a listing of various exemplary control modes that may be available in locomotives and may be selected to best meet train performance under a variety of operational and/or environmental conditions.

A) Independent control of tractive effort
B) Low speed control
C) Tractive effort reduction to avoid undesirable conditions
D) Fuzzy logic speed control
E) Automatic coupling of locomotive to railcars
F) Remotely controlled locomotive car kicking In accordance with aspects of the present invention, it is contemplated that any of such control strategies could be provided based on an automated control strategy configured to select any appropriate mode of control in view of operational and/or environmental conditions being experienced by the locomotives and further in view of the available equipment, and the quality of communications likely or actually encountered under such operational and/or environmental conditions.

In one exemplary embodiment, one or more sensing devices may be used that, for example, can measure rail track condition, or that can make a determination on how much the wheels may slide, or sensing the presence of undesirable objects on the tracks, e.g., wet leaves. Thus, if one can sense such environmental conditions, one might run a different algorithm to achieve improved anti-slip or wheel traction control. Accordingly, one need not just sense signals indicative of the speed and forces acting on the locomotive, but one can also detect or sense those factors that would affect our ability to provide suitable control. Other examples may be sensing track wetness or inclination, whether the locomotive is on a hill, or rounding on a curve. As will be appreciated by those skilled in the art, sensing such environmental conditions may be used for determining whether the propulsion system of the locomotive is operating at an appropriate power level.

It will be further appreciated that the control mode may be selected to optimize one or more operational parameters, such as fuel efficiency faster stops engine stress reduction tractive efforts faster acceleration Further, the control strategy may be configurable to account for variations due to differences in performance of different model of locomotives, or in view of different train configurations, heavy load versus light load, desired outcome, such as optimizing travel time, conserving fuel regardless of increasing travel time, equipment availability (or lack thereof), etc. The present invention contemplates tight integration between the respective control and communication equipment so that each data or information required for implementing any particular control mode is accurately and timely communicated and addressed to the appropriate equipment. It is further contemplated that the control strategy is configured to take advantage of presently available hardware in order to reduce the need of changes to existing hardware.

While the preferred embodiments of the present invention have been shown and described herein, it will be obvious that such embodiments are provided by way of example only. Numerous variations, changes and substitutions will occur to those of skill in the art without departing from the invention herein. Accordingly, it is intended that the invention be limited only by the spirit and scope of the appended claims.

What is claimed is:

1. A communication system for a railroad train comprising at least one locomotive for automatically adjusting the communication system to provide effective communication of command data for control of the operation of the locomotive, the system comprising:

a transceiver on the locomotive;

at least one transceiver remote from the locomotive, the transceiver constituting part of a communication system;

a database storing data relative to a plurality of communication schemes available to the communication system;

a first monitor for sensing a parameter indicative of the quality of the communications between the transceivers when the transceivers are operating under a first one of the available communication schemes and generating data indicative of communications quality; and a processor in communication with the monitor and the database for selecting at least a second communication scheme when the quality of the communications provided by the first communication scheme is not satisfactory to ensure that the command data will be reliably communicated with respect to the locomotive.

2. The communication system of claim 1 wherein the database includes data indicative of predetermined choices for selecting each available communications scheme.

3. The communication system of claim 1 wherein the processor for selecting the second communications scheme is configured to evaluate the communications quality of the first communication scheme.

4. The communication system of claim 1 wherein the processor for selecting the second communications scheme is configured to evaluate the communications quality of the first communications scheme relative to the communications quality of the second communications scheme.

5. The communication system of claim 1 wherein the processor for selecting the second communications scheme includes data for evaluating the communications quality of the second communications scheme.

6. The communication system of claim 1 wherein, in the event the second communications scheme is unable to provide satisfactory communication quality, the processor is further configured to select another communications scheme likely to provide satisfactory communications quality.

7. The communication system of claim 1 wherein the database includes data indicative of a plurality of distinct communication protocols available to the communication system, and the processor further includes a module for selecting a first communication protocol from the plurality of distinct communication protocols based on the likelihood of the first protocol to provide satisfactory communication quality.

8. The communication system of claim 7 wherein the protocol-selecting module is further configured to select a second communication protocol when the quality of the communications provided by the first communication protocol is not satisfactory.

9. The communication system of claim 1 wherein the database includes data indicative of a plurality of distinct frequencies available to the communication system, and the processor further includes a module for selecting a first one of the available frequencies based on the likelihood of the first frequency to provide satisfactory communication quality.

10. The communication system of claim 9 wherein the frequency-selecting module is further configured to select a second one of the available frequencies when the quality of the communications provided by the first frequency is not satisfactory.

11. The communication system of claim 1 wherein the database includes data indicative of multiple communication devices distributed throughout the train, and the processor includes a module for selecting a first communication device from the multiple communication devices distributed throughout the train, wherein said selection is based on determining which respective communication device is likely to provide satisfactory communication quality.

12. The communication system of claim 11 wherein the device-selecting module is further configured to select a second one of the multiple communication devices when the quality of the communications provided by the first communication device is not satisfactory.

13. The communication system of claim 1 wherein the database includes data indicative of a plurality of distinct message configurations, and the processor includes a module for selecting a first one of the plurality of distinct message configurations based on the likelihood of the first message configuration to ensure reception of the command data throughout the train.

14. The communication system of claim 13 wherein the module for selecting the message configuration is further configured to select a second one of the message configurations when the quality of the communications provided by the first message configuration is not satisfactory.

15. The communication system of claim 14 wherein the message configuration is selected from the group consisting of message data rate, message reply, message repetition, and message encryption.

16. The communication system of claim 13 wherein each message includes code configured to communicate to each transceiver a communication scheme to switch to in the event of sudden communication loss.

17. The communication system of claim 1 wherein the database includes data indicative of a plurality of distinct types of data communicable by the communication system, and the processor includes a module for selecting a first type of data to be communicated by the communication system, the first type of data being selected from the plurality of distinct types of data based on the likelihood of the first type of data in being satisfactorily communicated by the communication system.

18. The communication system of claim 17 wherein the module for selecting the data type to be transmitted is further configured to select a second type of data when the quality of the communications obtained by the first type of data is not satisfactory.

19. The communication system of claim 1 wherein the database includes data indicative of a plurality of distinct types of data sources available to the communication system, and the processor includes a module for selecting a first one of the distinct types of data sources based on the likelihood of the first type of data source to obtain satisfactory communication quality.

20. The communication system of claim 19 wherein the module for selecting the type of data source is further configured to select a second type of data source when the quality of the communications obtained by the first type of data source is not satisfactory.

21. The communication system of claim 1 wherein the database includes data indicative of a plurality of distinct types of data targets available to the communication system, and the processor includes a module for selecting a first one of the distinct types of data targets based on the likelihood of the first type of data target to obtain satisfactory communication quality.

22. The communication system of claim 21 wherein the module for selecting the type of data target is further configured to select a second type of data target when the quality of the communications obtained by the first type of data target is not satisfactory.

23. The communication system of claim 1 further comprising at least one sensor for monitoring an environmental condition in the vicinity of the train, and wherein the database for storing data relative to the plurality of communication schemes associates the communication schemes with environmental conditions of the train, with the processor being configured to access said database for determining whether to change to a more appropriate communications scheme in view of the monitored environmental conditions.

24. The communication system of claim 1 further comprising at least one sensor for monitoring an operational condition in the vicinity of the train, and wherein the database for storing data relative to the plurality of communication schemes associates the communication schemes with operational conditions of the train, with the processor being configured to access said database for determining whether to change to a more appropriate communications scheme in view of the monitored operational conditions.

25. A communication method for a railroad train comprising at least one locomotive for automatically adjusting a communication system to provide effective communication of command data for control of the operation of the train, the method comprising:

providing a transceiver on a locomotive and at least one transceiver remote from the locomotive, the transceiver constituting part of a communications system;

directing command data via the communication system;

storing in a database data indicative of a plurality of communication schemes available to the communication system;

sensing a parameter indicative of the quality of the communications sent via the communications system;

generating data indicative of communications quality; and selecting a second communication scheme when the quality of the communications provided by the first communication scheme is not satisfactory to ensure that the command data will be reliably communicated with respect to the locomotive.

26. The communication method of claim 25 further including in the database data indicative of predetermined choices for selecting each available communications scheme.

27. The communication method of claim 25 wherein the selecting of the second communications scheme comprises evaluating the communications quality of the first communication scheme.

28. The communication method of claim 25 wherein the selecting of the second communications scheme comprises evaluating the communications quality of the first communications scheme relative to the communications quality of the second communications scheme.

29. The communication system of claim 25 wherein the selecting of the second communications scheme comprises evaluating the communications quality of the second communications scheme.

30. The communication method of claim 25 wherein, in the event the second communications scheme is unable to provide satisfactory communication quality, selecting another communications scheme likely to provide satisfactory communications quality.

31. The communication method of claim 25 further comprising storing data indicative of a plurality of distinct communication protocols available to the communication system, and selecting a first communication protocol from the plurality of distinct communication protocols based on the likelihood of the first protocol to provide satisfactory communication quality.

32. The communication method of claim 31 further comprising selecting a second communication protocol when the quality of the communications provided by the first communication protocol is not satisfactory.

33. The communication method of claim 25 further comprising storing data indicative data indicative of a plurality of distinct frequencies available to the communication system, and selecting a first one of the available frequencies based on the likelihood of the first frequency to provide satisfactory communication quality.

34. The communication method of claim 33 further comprising selecting a second one of the available frequencies when the quality of the communications provided by the first frequency is not satisfactory.

35. The communication method of claim 25 further comprising storing data indicative of multiple communication devices distributed throughout the train, and selecting a first communication device from the multiple communication devices distributed throughout the train, wherein said selection is based on determining which respective communication device is likely to provide satisfactory communication quality.

36. The communication method of claim 35 further comprising selecting a second one of the multiple communication devices when the quality of the communications provided by the first communication device is not satisfactory.

37. The communication method of claim 25 further comprising storing data indicative of a plurality of distinct message-repeating techniques, and selecting a first one of the plurality of distinct message-repeating techniques based on the likelihood of the first message-repeating technique to ensure reception of the command data.

38. The communication method of claim 37 further comprising selecting a second one of the message-repeating techniques when the quality of the communications provided by the first message-repeating techniques is not satisfactory.

39. The communication method of claim 25 further comprising storing data indicative of a plurality of distinct message-reply techniques available to the transceivers, and selecting a first one of the plurality of distinct message-reply techniques based on the likelihood of the first message-reply technique to ensure reception of the command data.

40. The communication method of claim 39 further comprising selecting a second one of the message-reply techniques when the quality of the communications provided by the first message-reply technique is not satisfactory.

41. The communication method of claim 25 further comprising storing data indicative of a plurality of distinct types of data communicable by the communication system, and selecting a first type of data to be communicated by the transceivers, the first type of data being selected from the plurality of distinct types of data based on the likelihood of the first type of data in being satisfactorily communicated by the communication system.

42. The communication method of claim 41 further comprising selecting a second type of data when the quality of the communications obtained by the first type of data is not satisfactory.

43. The communication method of claim 25 further comprising storing data indicative of a plurality of distinct types of data sources available to the communication system, and selecting a first one of the distinct types of data sources based on the likelihood of the first type of data source to obtain satisfactory communication quality by the communication system.

44. The communication method of claim 43 further comprising selecting a second type of data source when the quality of the communications obtained by the first type of data source is not satisfactory.

45. The communication method of claim 25 further comprising storing data indicative of a plurality of distinct types of data targets available to the communication system, and selecting a first one of the distinct types of data targets based on the likelihood of the first type of data target to obtain satisfactory communication quality by the communication system.

46. The communication method of claim 25 further comprising monitoring an environmental condition in the vicinity of the train, and wherein the database for storing data relative to the plurality of communication schemes associates the communication schemes with environmental conditions of the train, the processor being configured to access said database for determining whether to change to a more appropriate communications scheme in view of the monitored environmental conditions.

47. The communication method of claim 25 further comprising monitoring an operational condition in the vicinity of the train, and wherein the database for storing data relative to the plurality of communication schemes associates the communication schemes with operational conditions of the train, the processor being configured to access said database for determining whether to change to a more appropriate communications scheme in view of the monitored operational conditions.

48. A communication system for a vehicle for selecting a preferred communication scheme for providing reliable data communication to the vehicle, the system comprising:
a first transceiver on the vehicle;
a second transceiver remote from the first transceiver in communication with the first transceiver;
a first monitor for sensing a parameter in the communication system that affects the quality of the communication between the transceivers;

a first database of communication schemes available to the transceivers;

a second database relating the parameter sensed by the monitor to anticipated levels of communication quality for each communication scheme; and a processor in communication with the monitor, first database and second database for selecting a preferred communication scheme to provide a satisfactory level of communication quality for the parameter sensed by the monitor, and for communicating the preferred communication scheme to at least one of the transceivers.

49. The communication system of claim 48 wherein the processor prioritizes the available communications schemes based on their anticipated levels of communication quality for the parameter sensed by the monitor.

50. The communication system of claim 48 wherein the parameter sensed by the monitor is selected from the group consisting of environmental and operational conditions of the vehicle.

51. The communication system of claim 48 wherein the processor is configured to provide substantially uninterrupted communication between the transceivers when transitioning from any one of the available communication schemes to another one of the communication schemes.

52. The communication system of claim 48 further comprising a second monitor for sensing a parameter indicative of the quality of the communications between the transceivers when the transceivers are operating under a first one of the available communication schemes and generating data indicative of communications quality.

53. The communication system of claim 52 wherein the processor prioritizes the available communications schemes based on their actual levels of communication quality relative to the anticipated levels of communication quality for the parameter sensed by the first monitor.

54. The communication system of claim 50 further comprising a third database for storing data relative to the plurality of communication schemes associating the communication schemes with conditions of the vehicle, the processor configured to access said database for determining whether to change to a more appropriate communications scheme in view of the conditions.

55. An intelligent communication, command and control system for a railroad train comprising at least one locomotive, the system comprising:

a communication system configured to provide a plurality of communication schemes for communicating command data usable for controlling operation of the train;

control equipment configured to provide a plurality of control modes responsive to command data communicated via the communication system;

a database storing data for associating the plurality of communication schemes with the plurality of control modes based on the data communication requirements of each respective control mode; and a processor coupled to the database configured to match a communication scheme with a control mode for reliable control of the operation of the train in response to the command data communicated via the communication system.

56. The control system of claim 55 wherein in the event the selected communication scheme cannot reliably communicate the command data for any selected control mode, the processor being further configured to select a second control mode whose data communication requirements are likely to be met by a presently available communication scheme.

57. The control system of claim 55 wherein in the event the selected communication scheme cannot reliably communicate the command data for any selected control mode, the processor being further configured to select a second communication scheme likely to meet the communication requirements of a presently related selected mode.

58. The control system of claim 55 wherein the communication equipment comprises a first transceiver on the at least one locomotive, and a second transceiver remote from the first transceiver in communication with the first transceiver.

59. The control system of claim 58 further comprising a first monitor for sensing a parameter in the communication equipment that affects the quality of the communication between the transceivers.

60. The control system of claim 55 wherein the processor prioritizes the available communications schemes based on their anticipated levels of communication quality for the parameter sensed by the monitor, and further based on the data communication requirements of the presently selected control mode.

61. The control system of claim 55 wherein said database further includes data for relating each communication scheme to environmental and/or operational conditions of the train, the processor configured to access said database for determining whether to change to a more appropriate communications scheme in view of at least one of the following criteria: said conditions, the communication quality being presently provided by the communication scheme, and the data communication requirements of the presently selected control mode.

* * * * *